United States Patent
Thiel et al.

(10) Patent No.: US 9,348,030 B2
(45) Date of Patent: May 24, 2016

(54) HYBRID SATELLITE POSITIONING RECEIVER

(75) Inventors: Andreas Thiel, Wilen bei Wollerau (CH); Michael Ammann, Huenenberg (CH)

(73) Assignee: u-blox AG, Thalwil (CH)

(*) Notice: Subject to any disclaimer, the term of this patent is extended or adjusted under 35 U.S.C. 154(b) by 890 days.

(21) Appl. No.: 12/970,825

(22) Filed: Dec. 16, 2010

(65) Prior Publication Data

US 2011/0148697 A1 Jun. 23, 2011

Related U.S. Application Data

(60) Provisional application No. 61/293,178, filed on Jan. 7, 2010.

(30) Foreign Application Priority Data

Dec. 17, 2009 (EP) ..................................... 09275127

(51) Int. Cl.
| | |
|---|---|
| *G01S 19/35* | (2010.01) |
| *G01S 19/09* | (2010.01) |
| *G01S 19/34* | (2010.01) |
| *G01S 19/24* | (2010.01) |

(52) U.S. Cl.
CPC ........ *G01S 19/34* (2013.01); *G01S 19/24* (2013.01)

(58) Field of Classification Search
USPC ............ 342/357.71–357.72, 357.75–357.77, 342/357.59–357.61, 357.25, 357.45, 342/357.74, 357.46; 701/468, 483
See application file for complete search history.

(56) References Cited

U.S. PATENT DOCUMENTS

| | | | |
|---|---|---|---|
| 5,515,043 A | 5/1996 | Berard et al. | |
| 5,592,173 A * | 1/1997 | Lau et al. ................. | 342/357.74 |
| 6,295,024 B1 | 9/2001 | King et al. | |
| 2001/0017599 A1 | 8/2001 | Yule et al. | |
| 2002/0027525 A1* | 3/2002 | Pietila et al. ............. | 342/357.15 |
| 2005/0162312 A1 | 7/2005 | Riday | |
| 2006/0038719 A1 | 2/2006 | Pande et al. | |
| 2007/0152879 A1* | 7/2007 | Pande ....................... | 342/357.06 |

(Continued)

FOREIGN PATENT DOCUMENTS

| | | |
|---|---|---|
| CN | 1947029 A | 4/2007 |
| WO | WO 2004/059337 A1 | 7/2004 |

(Continued)

OTHER PUBLICATIONS

Office Action issued by Japanese Patent Office in Japanese Patent Application No. 2010-280455 dated Apr. 18, 2014. 6 pages.

(Continued)

*Primary Examiner* — Dao Phan
(74) *Attorney, Agent, or Firm* — Blakely Sokoloff Taylor & Zafman LLP

(57) ABSTRACT

A satellite positioning receiver. The receiver comprises: an RF front end, for receiving satellite positioning signals; an analog to digital converter, for sampling the received signals to generate signal samples; a memory; and a processor, for processing the signal samples to derive code-phases and pseudo-ranges and to calculate a position fix. The processor has a first mode in which it is operable to process the samples as they are generated, to calculate the position fix. It also has a second mode in which it is operable to store the samples or the code-phases or pseudo-ranges in the memory for later processing.

11 Claims, 3 Drawing Sheets

(56) References Cited

U.S. PATENT DOCUMENTS

2008/0240315 A1 10/2008 De Mey et al.
2008/0262728 A1 10/2008 Lokshin et al.

FOREIGN PATENT DOCUMENTS

| WO | WO 2005/050243 A2 | 6/2005 |
|---|---|---|
| WO | WO 2006/018803 A1 | 2/2006 |
| WO | WO 2008/068704 A2 | 6/2008 |
| WO | WO 2009/000842 A1 | 12/2008 |

OTHER PUBLICATIONS

Office Action issued by State Intellectual Property Office of People's Republic of China in Chinese Patent Application No. 201010610169.0 dated Nov. 19, 2013. 22 pages.

\* cited by examiner

HYBRID SATELLITE POSITIONING RECEIVER

This is a non-provisional application claiming the benefit of U.S. Provisional Application No. 61/293,178, filed Jan. 7, 2010.

BACKGROUND OF THE INVENTION

1. Field of the Invention

This invention relates to a receiver for a Global Navigation Satellite System (GNSS) and to methods of processing received satellite signals for such a receiver. It is particularly relevant to the Global Positioning System (GPS).

2. Description of Related Art

GPS is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just less than 24 hours.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional, real-time GPS receiver reads the transmitted data message and saves the ephemeris, almanac and other data for continual use. This information can also be used to set (or correct) the clock within the GPS receiver.

To determine position, a GPS receiver compares the time a signal was transmitted by a satellite with the time it was received by the GPS receiver. The time difference tells the GPS receiver how far away that particular satellite is. The ephemeris for that satellite enables the GPS receiver to accurately determine the position of the satellite. By combining distance measurements from multiple satellites with the knowledge of their positions, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude. The information received from the satellites can also be used to set (or correct) the clock within the GPS receiver.

By processing the apparent Doppler shifts of the signals from the satellites, a GPS receiver can also accurately provide speed and direction of travel (referred to as 'ground speed' and 'ground track').

A complete data signal from the satellites consists of a 37,500 bit Navigation Message, which takes 12.5 minutes to send at 50 bps. The data signal is divided into 25 30 s frames, each having 1500 bits and these are divided into five 6 s subframes. Each 6 s subframe is divided into ten 30 bit words. All the information necessary for a position fix (ephemeris etc) is contained within each frame and so a GPS receiver will typically take around 30 s to produce a position fix from a so-called cold start. This is often called "time to first fix" (TTFF).

The first subframe gives clock correction data, the second and third subframes give ephemeris data and the almanac data is in the fourth and fifth subframes.

The SVs all broadcast on the same frequency. In order to distinguish a signal from a particular satellite, the receiver needs to generate a replica of the C/A code known to be in use by that satellite and align it so that it is synchronised with the incoming signal which will be delayed by an unknown amount predominantly due to the time of flight of the signal in travelling from the satellite to the receiver (typically around 0.07 s). In general, it is not possible for a receiver to accurately predict the alignment necessary to get the replica in sync with the incoming signal, so some form of search is required, with a number of alignments being tried in turn and the best match being selected. This process of evaluating a number of candidate alignments is normally termed correlation as the receiver implements a correlation function between the received signal and the known C/A code for each satellite in turn, to determine if the received signal includes a component having the C/A code from a particular SV. The correlation function has to be calculated for multiple relative timings, and when the correlation peak is found, this corresponds to a particular timing and a particular SV. The discovered timing in turn corresponds to a particular distance from the SV.

The search for each satellite C/A code is complicated by the fact that the apparent frequency of the satellite signal observed by the receiver will vary. The principal sources of variation are the Doppler-effect due to the movement of the satellite; Doppler-effect due to movement of the receiver; and local-oscillator offset and drift at the receiver. This means that an exhaustive search for the C/A code requires the evaluation of the correlation function at a range of phase (temporal) shifts for each of a range of frequency shifts.

The correlation process is sometimes referred to as "despreading", since it removes the spreading code from the signal. The determined code-phase—that is, the timing of the peak of the correlation function—reveals the accurate timing information for use in the distance calculation. However, as the code is repeated every millisecond, the coarse timing also needs to be determined. Typically, less frequently repeating data components are used for the more coarse timing evaluation (i.e. to enable GPS time to be derived), such as the individual bits of the 50 bps data message and specific parts of it such as the subframe preamble or subframe handover word.

Together, the code-phase and coarse timing information comprise a "pseudo-range", because they identify the time-of-flight of the message from the satellite. This time-of-flight is related to the distance travelled, by c, the speed of light. This is a "pseudo"-range or relative range (rather than a true range) because the relative offset between the satellite's clock and the receiver's clock is unknown. However, this offset is the same for all satellites (since their clocks are synchronized); so, pseudo-ranges for a set of diverse satellites provide sufficient information for the trilateration calculation to determine a unique position fix.

The majority of GPS receivers work by processing signals from the satellites in "real time", as they are received, reporting the position of the device at the current time. Such "conventional" GPS receivers invariably comprise:

an antenna suitable for receiving the GPS signals, analogue RF circuitry (often called a GPS front end) designed to amplify, filter, and mix down to an intermediate frequency (IF) the desired signals so they can be passed through an appropriate analogue-to-digital (A/D) converter at a sample rate normally of the order of a few MHz, digital signal processing (DSP) hardware that carries out the correlation process on the IF data samples generated by the A/D converter, normally combined with some form of micro controller that carries out the "higher level" processing necessary to control the signal processing hardware and calculate the desired position fixes.

The less well known concept of "Store and Process Later" (also known, and hereinafter referred to, as "Capture and Process") has also been investigated. This involves storing the IF data samples collected by a conventional antenna and analogue RF circuitry in some form of memory before processing them at some later time (seconds, minutes, hours or even days) and often at some other location, where processing resources are greater.

This means that a Capture and Process receiver is considerably simpler than a real-time receiver. Only short segments of samples need to be stored—for example, 100-200 ms worth of data. There is no longer any need to decode the (very slow) data message from each SV; no need to perform correlation and determine pseudo-ranges; and no need to execute the trilateration to calculation to derive a position fix. Accordingly, much of the digital signal processing hardware of the conventional receiver can be eliminated, reducing complexity and cost. Power consumption is also significantly reduced, leading to longer battery life.

Other capture and process receivers have also been proposed which include the DSP hardware necessary for calculating position fixes. In one mode, such a device receives, samples and stores GPS signals in a memory, but does not process them. When switched to a separate mode, the device ceases receiving signals and instead starts processing those samples which were stored previously. A device of this kind is suitable for generating a posthumous track-log, or history of movements, for example after the user has returned from a trip.

BRIEF SUMMARY OF THE INVENTION

According to an aspect of the present invention, there is provided a satellite positioning receiver comprising: an RF front end, for receiving satellite positioning signals; an analogue to digital converter, for sampling the received signals to generate signal samples; a memory; and a processor, for processing the signal samples to derive code-phases and pseudo-ranges and calculate a position fix, the receiver having a first mode in which it is operable to process the samples immediately as they are received, to calculate a position fix and a second mode in which it is operable to store the samples or the code-phases or pseudo-ranges in the memory for later processing.

This is a hybrid receiver, which combines advantages of a real-time receiver with those of a capture-and-process receiver. Unlike known receivers, it offers the benefits of capture-and-process technology combined with the ability to also support real-time navigation. The present inventors have recognised that, contrary to the conventional wisdom, there are certain applications in which it is advantageous for a single receiver to behave as either a capture and process receiver or as a real-time receiver, depending upon the circumstances. For example, in a capture-and-process track-log device of the type sometimes used in outdoor recreation, it may be very useful to calculate a "live" position fix in an emergency. Conversely, for a real-time receiver, it may be useful to function in capture-and-process mode temporarily—for example, for a period soon after start-up, before real-time positioning functions have been initialised.

The first mode may be selected in response to connection of the receiver to an external power supply.

This provides a hybrid receiver that produces position fixes in real-time when connected to an external power source (such as a car battery), but which stores samples (or code-phase or pseudo-range measurements) when running on internal battery power. The stored samples or intermediate measurements are suitable for retrospective calculation of position fix if and when desired. This allows the device to function in a first, high-power, real-time navigation mode when connected to a plentiful energy supply but to operate in a second, low-power, off-line track-log mode when running on its own battery. Battery life is extended by automatic switching between these modes.

Alternatively, the second mode may correspond to a standby condition—when real-time navigation functions are not required and the device is intended to be consuming minimal power.

According to some embodiments, there is provided a satellite positioning receiver comprising: an RF front end, for receiving satellite positioning signals; an analogue to digital converter, for sampling the received signals to generate signal samples; a memory; and a processor adapted to: determine whether satellite trajectory information of sufficient quality is available at the receiver; if the trajectory information is available, process the samples to calculate a position fix; and if the trajectory information is unavailable, store the samples in the memory for later processing.

When satellite trajectory information of the required quality is available, the device can function in a first mode, like a normal real-time receiver, reporting instantaneous position. However, this is augmented by the ability to store signal samples in a memory, in a second mode, when inadequate trajectory information is available.

The present inventors have recognised a drawback of known, real-time satellite positioning receivers, in that these are unable to begin measuring the device's position until after the ephemeris in each satellite's data message has been received and decoded. This leads to a long TTFF, particularly after a cold-start. It would be useful, in many practical applications, to be able to provide a record of the device position before the satellite trajectory information becomes available (even if the actual position fixes cannot be reported until afterward). The solution is to temporarily switch to a mode in which the received samples are buffered. In particular, this is based on the recognition that satellite trajectory information such as ephemeris and almanac data is valid over a moderate period, not only after the information has been transmitted by each satellite, but also for a period before transmission. This is counter-intuitive, but it allows extrapolation the satellite's trajectory into the past, in a reversal of the process normally used by a real-time receiver to predict satellite position in the future.

The two modes (real-time and buffered) are not necessarily mutually exclusive: it may sometimes be advantageous to buffer the samples in addition to processing them. For example, if sparse or low accuracy satellite trajectory is available, the samples can be processed immediately (to produce an approximate position), while also being stored in a memory in case more accurate or complete trajectory information becomes available later. Clearly, if the samples are buffered because no trajectory information whatsoever is available, then it is not possible to process them immediately.

Note that the satellite trajectory information referred to may comprise ephemeris or (less accurate) almanac data for several satellites. The more accurate and complete the trajectory information, the more accurate the resulting position fix is likely to be. In this context, therefore, the minimum valid satellite trajectory information is that sufficient to allow at least a broad estimate of position to be calculated. The particular criteria for deciding when satellite trajectory information are of sufficient quality (that is, completeness and accuracy) may be predetermined according to the intended use of the satellite positioning receiver; or they may vary over time and/or when a single receiver is used for different purposes.

For example, a position estimate based on current almanac data will typically be accurate to within several kilometers. This should be enough to identify the county or nearest city. Even the ability to identify the state or country can be useful for some purposes—especially if this initial estimate can be refined later. In other applications, such vague position estimates may be of little or no value and so the predetermined threshold level of quality will be correspondingly higher. Essentially, the receiver is making a decision about whether it is worthwhile to process the signal samples immediately, given the quality of the satellite trajectory data available at the time.

The quality of the satellite trajectory information can also depend on its age. It should be sufficiently fresh that there is a reasonably low expectation of the trajectory of the satellites in question having changed significantly between the time to which the trajectory information relates and the time of capture of the samples.

The processor may be further adapted to, when satellite trajectory information of sufficient quality becomes available after a period of unavailability: retrieve stored samples from the memory; and process the samples to calculate a position fix, based on the satellite trajectory information.

This allows the receiver to retrospectively process samples that were stored when inadequate trajectory data was available, once sufficiently high-quality trajectory data can be obtained. The satellite trajectory data may be obtained or provided by various means: for example, the receiver may receive and decode a sufficient portion of a satellite data message to obtain the almanac and/or ephemeris. The receiver could also be provided with ephemeris via some other communications channel, such as a terrestrial wireless transmission. This is sometimes referred to as data-aiding. Trajectory data downloaded from an external source in this way may be retrospective—that is, it may correspond to the actual time at which the samples in question were received. Historical almanac and ephemeris are available from providers via the internet, for example.

As an alternative (or in addition) to the retrospective processing of stored samples by the receiver, the processor in the receiver may be adapted to upload the stored samples to another device for retrospective processing. In one such example, the receiver processes the samples in real-time if live trajectory information of the required quality is available; but, when such trajectory information is not available at the time of receiving the satellite signals, the samples are stored and later processed by the other device. For example, stored samples may be uploaded to a personal computer (PC) that has an internet connection. The PC can then download the relevant trajectory information needed to process the samples and derive a position fix.

The analogue to digital converter may be operable to sample the received signals over a predetermined interval to generate a set of samples of predetermined size; and the processor may be adapted to process the set of samples exhaustively to calculate the position fix, before any further sets of samples are processed.

Traditional real-time receivers operate with a processing pipeline that allows a limited amount of time to process each segment of signal samples produced by the RF front-end. This typically results in only a small part of the search space (of phase and frequency, for each satellite C/A code) being tested for each given set of samples. The inventors have recognised that this wastes energy at the front-end and A/D converter. When operating in the buffering mode, the present receiver can operate more efficiently, by applying the full search to each set of samples, before moving on and requesting a further set of samples from the front-end. In this way, each individual set of samples can be exploited to the same, maximal extent.

According to other embodiments, there is provided a satellite positioning receiver comprising: an RF front end, for receiving satellite positioning signals; an analogue to digital converter, for sampling the received signals to generate signal samples; a memory; and a processor adapted to: process the samples as they are received, to derive code-phase or pseudo-range data; determine whether satellite trajectory information of sufficient quality is available at the receiver; if the trajectory information is available, process the code-phase or pseudo-range data to calculate a position fix; and if the trajectory information is unavailable, store the derived code-phase or pseudo-range data in the memory for later processing.

In this variant, the receiver processes received samples as normal for a real-time receiver, to measure code-phases or pseudo-ranges. (To establish a pseudo-range requires more processing, because it is necessary to determine the position in the data message, in addition to the code-phase.) Then, depending on the availability of satellite trajectory information of some specified quality, these measurements are either stored or processed. The underlying concept is the same as when choosing to process or store samples, but the processing pipeline of the receiver is interrupted at a different stage. This approach has similar advantages to those described above. In addition, the knowledge of which satellites have yielded code-phase or pseudo-range measurements can enable a more informed decision about whether adequate satellite trajectory information is available (for example, the ephemeris of satellites not in view will be irrelevant to the decision).

It is likely that the original samples will be discarded after pseudo ranges have been calculated. However, it is also possible that the samples are stored in parallel with the derived pseudo-ranges. If the samples are not being retained, it may be beneficial to extract other useful intermediate data from the samples, before they are deleted. For example, the detected signal strength; observed carrier frequency; or estimates of reliability or accuracy may be recorded for later use. This data can be used to augment the pseudo-range data or to calculate additional parameters—for example, velocity, based on the observed pattern of Doppler shifts of the carrier frequency.

If code-phase measurements are stored, they may also include bit-edge measurements (although this is not essential). Note that, in practice, code-phase measurements are not sufficient by themselves to calculate pseudo-ranges, due to the coarse timing ambiguity. However, they can be augmented by storing information of any kind that is sufficient to resolve this ambiguity. For example, a real-time clock in the receiver may generate a time-stamp that is accurate enough to resolve the ambiguity, once it can be synchronised to the satellite clock at some time-instant.

The processor is preferably further adapted to, when valid satellite trajectory information becomes available after a period of unavailability: retrieve the stored code-phase or pseudo-range data from the memory; and process it to calculate a position fix, based on the satellite trajectory information.

The processor may be adapted to deactivate the RF front end and/or A/D converter while processing the samples to derive the code-phase or pseudo-range data.

This enables the power consumption of the device to be reduced, because energy is not wasted on capturing additional signal samples before the processing of the previous samples is complete.

The analogue to digital converter may be operable to sample the received signals over a predetermined interval to generate a set of samples of predetermined size; and the processor may be adapted to process the set of samples exhaustively to derive the code-phase or pseudo-range data, before any further sets of samples are processed.

The processor may be further adapted to retrieve and process the stored samples or code-phase or pseudo-range data only when an external power source is detected.

Once samples (or intermediate measurements) have been stored (rather than processed), it may be desirable to continue to minimise power consumption until an unrestricted power supply is available. After storing, the receiver may have reverted to the normal real-time mode, but the previously stored data are not processed retrospectively until both valid trajectory information and a suitable power source are provided.

The processor is preferably further adapted to store in the memory a time-stamp associated with the stored samples or code-phase or pseudo-range data.

An indication of the time instant to which the stored signal samples or measurements correspond is useful when they are later processed to calculate a position fix. If a historical record of satellite trajectory data is available, it is necessary to choose which data are most relevant to the samples (or code-phases or pseudo-ranges) in question. Similarly, if the receiver downloads a single instance of satellite trajectory data, the time-stamp of capture enables the receiver to determine which of the stored samples (or intermediate measurements) overlap with the time interval when the trajectory data was valid.

The processor may be further adapted to: after the samples or code-phase or pseudo-range data have been processed to calculate a position fix, store them in the memory; when improved quality satellite trajectory information becomes available, retrieve them from the memory; and re-process them to calculate a revised position fix, based on the improved satellite trajectory information.

It is counter-intuitive to retain the samples or pseudo-ranges after a position fix has been calculated. Normally, such source and intermediate measurements would be discarded when a final result (the position fix) is calculated. However, the hybrid receiver of the invention may retain the stored data in memory, in the hope that better (or corrected) satellite trajectory data becomes available at a later time. This may happen, for example, if a position fix is initially calculated on the basis of almanac data, or incomplete ephemerides. When complete ephemerides for a greater number of satellites become available, the position fix can then be recalculated more accurately.

Also provided is a method for a satellite positioning receiver of processing satellite positioning signals received at the receiver and sampled to generate signal samples, the method comprising: determining whether valid satellite trajectory information is available at the receiver; if the trajectory information is available, processing the signal samples to calculate a position fix; and if the trajectory information is unavailable, storing the signal samples in a memory for later processing.

Also provided is a related alternative method of processing satellite positioning signals received at the receiver and sampled to generate signal samples, the method comprising: processing the samples to derive code-phase or pseudo-range data; determining whether valid satellite trajectory information is available at the receiver; if the trajectory information is available, processing the code-phase or pseudo-range data to calculate a position fix; and if the trajectory information is unavailable, storing the code-phase or pseudo-range data in a memory for later processing.

According to another aspect of the invention, there is provided a computer program comprising computer program code means adapted to perform all the steps these methods when said program is run on a computer; and such a computer program embodied on a computer readable medium.

BRIEF DESCRIPTION OF THE DRAWINGS

The invention will now be described by way of example with reference to the accompanying drawings, in which.

DETAILED DESCRIPTION OF THE INVENTION

Figure 1:
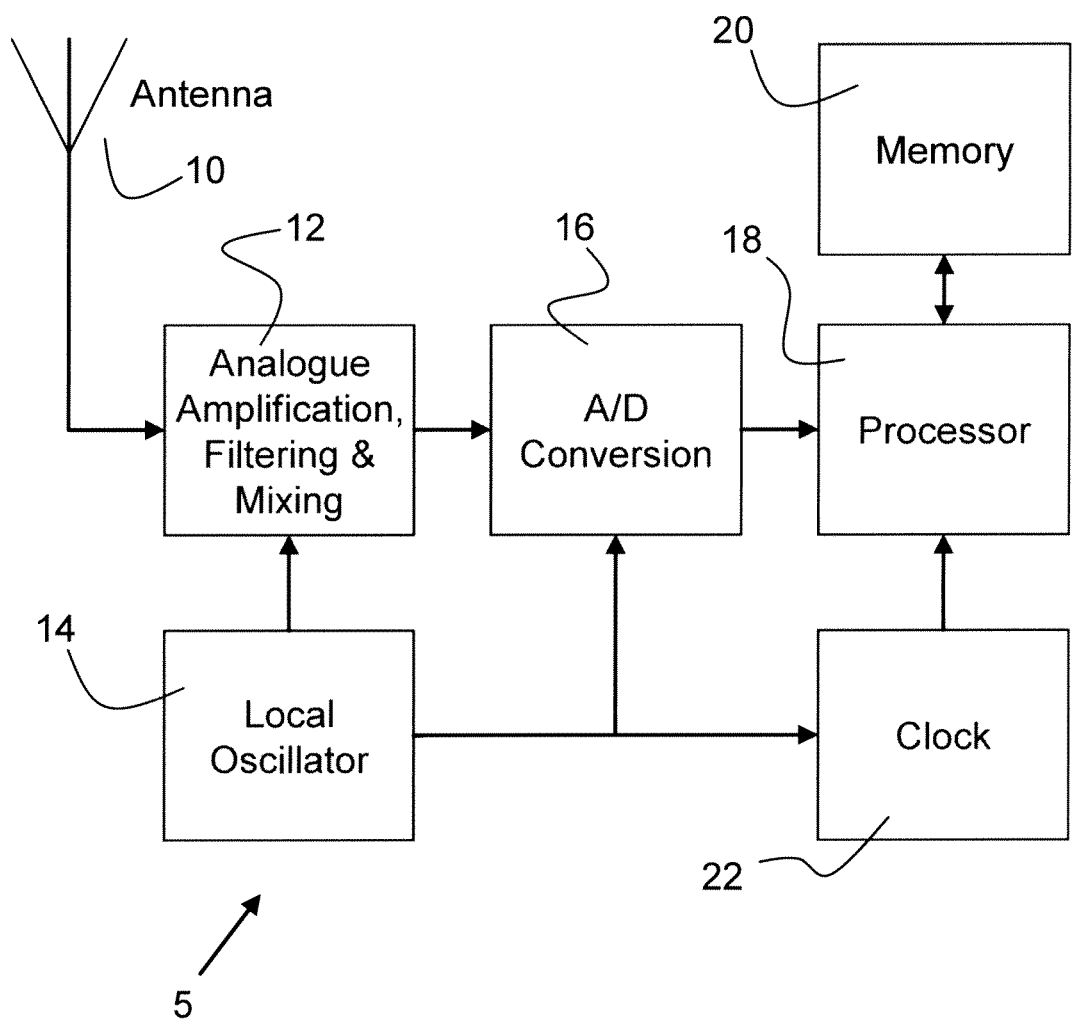
FIG. 1 is a block diagram of a satellite positioning receiver in accordance with an embodiment of the invention.

FIG. 1 shows a GPS receiver suitable for operating in accordance with embodiments of the invention. The GPS receiver 5 comprises an antenna 10 coupled to an RF front-end 12. The RF front-end 12 includes circuitry for amplifying GPS signals received via the antenna 10. It also includes filtering circuits for attenuating out-of-band interference; and a mixer. The mixer mixes the received signals with the output of a local oscillator 14. After further appropriate filtering, this yields an intermediate frequency (IF) signal that is input to analogue to digital converter 16. A/D converter 16 is synchronised to the local oscillator signal. The signal samples generated by the A/D converter 16 are output to processor 18 for processing. Note that the analogue circuits of the RF front-end 12 and the A/D converter 16 may be of conventional types, such as will be well known to the skilled person.

The processor 18 provides two modes for processing the signal samples received from the A/D converter 16. In the first mode, the processor operates to process the samples immediately as the signals are received and sampled. This processing comprises deriving pseudo-ranges and calculating a position fix. This mode is therefore suitable for real-time navigation, since a live position fix is provided. In the second mode, the processor is instead operable to store data in a memory 20 without completing the processing. The data stored in the memory 20 may comprise the raw samples of IF signals provided by the A/D converter 16, or it may comprise partially processed data, such as pseudo-ranges.

A real-time clock 22 is also provided. This is driven by the local oscillator 14 and can be used to produce time-stamps which are associated with the data stored in the memory 20. This allows later determination of the approximate time at which the data was stored.

Note that the processor 18 may be implemented as a bespoke hardware device, such as one or more application specific integrated circuits (ASICs). Alternatively, the processor 18 may comprise one or more general purpose processing units or digital signal processors (DSPs) which have been suitably programmed. Implementation of either alternative will be well within the capabilities of those skilled in the art.

Figure 2:
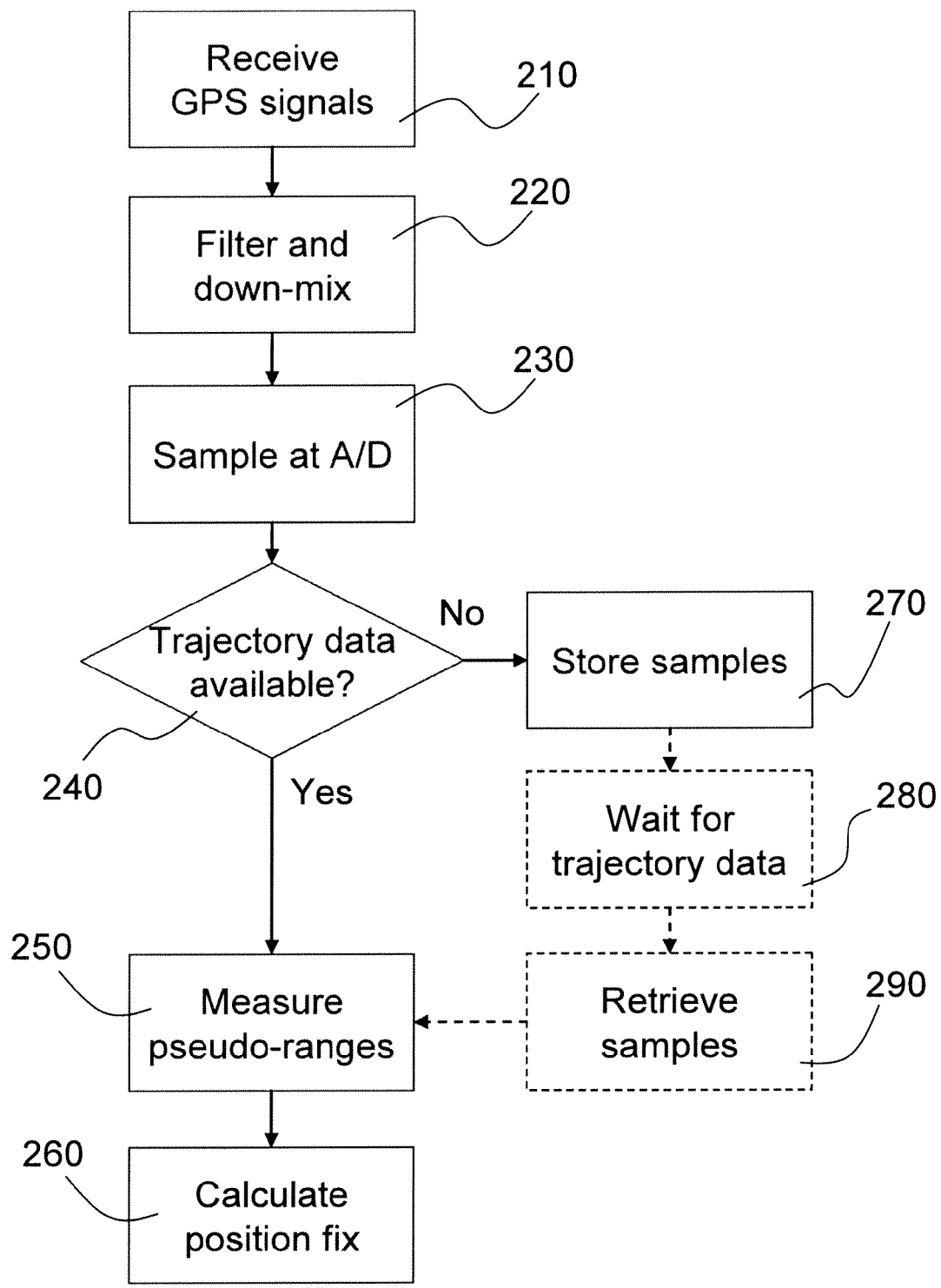
FIG. 2 is a flowchart of a method of processing satellite positioning signals according to a first embodiment of the invention.

According to a first embodiment of the invention, the GPS receiver 5 implements a method illustrated in the flow chart of FIG. 2.

The RF front-end receives 210 GPS signals through the antenna 10. These are filtered and down mixed 220 and then sampled 230 by the A/D converter 16. Typically, raw IF data is captured over a period of approximately 200 ms. The volume of data may be reduced, for example by reducing the bit-resolution or by decimation in time.

In this embodiment, the mode according to which the samples are processed is determined by the availability of satellite trajectory data. In step 240, the processor checks whether valid satellite trajectory data is available at the receiver. Here, valid trajectory data refers to almanac or ephemeris data which could be sufficient to calculate a position fix. For example, ephemeris data for three satellites could be sufficient if all three of the satellites were visible and pseudo-ranges could be calculated to them. (Of course, at this stage in the processing, it is generally unknown which satellites will be visible in the captured IF samples.) In order to be valid, the ephemeris or almanac data must also be reasonably fresh. For example, ephemeris is usually considered valid for up to two hours. However, it may still be possible to calculate a position fix using older ephemeris, to produce an approximate estimate.

If trajectory information is available, the processor 18 proceeds to process the IF signal samples in the normal way. This comprises measuring 250 pseudo-ranges to a plurality of satellites, by means of a correlation calculation. Using these pseudo-ranges and the available trajectory information, the processor then calculates 260 a position fix.

If, on the other hand, trajectory data is not available at the receiver, the processor stores 270 the set of samples in the memory 20. This is in contrast to known GPS receivers, which would discard these samples. According to this embodiment, the samples are retained in the memory 20 while the processor waits 280 for trajectory data to become available at the receiver. When such trajectory data is available, the processor 18 retrieves 290 the samples from the memory and proceeds to process them 250, 260, as normal.

Valid satellite trajectory data can be provided to the receiver 5 in a variety of ways. Almanac and ephemeris can be decoded from the satellite data message, similarly to a conventional real-time receiver. Alternatively, the receiver 5 may be aided by ephemeris and almanac data delivered over a separate communications link (not shown). For example, the data may be obtained from a database server via a wireless internet or cellular telephony connection. One advantage of the present method is the same regardless of how the satellite trajectory data is provided: it is possible to begin creating a record of position before the trajectory data has become available.

The length of time that the receiver will need to wait 280 for trajectory data will vary. In general, the trajectory data that is provided will not correspond exactly to the time at which the samples were stored 270. For this reason, it is preferable to record a time-stamp associated with the samples, which indicates the approximate time (according to the internal real-time clock 22) that the samples were received and digitised. Then, when trajectory data does become available, the orbital parameters of the satellites can be used to predict the locations of the constellation of satellites at the relevant time. The prediction may be forward or backward in time. Having some awareness of the configuration of the satellite constellation will help to prioritise the search for the satellite C/A codes in the correlation process, when measuring pseudo-ranges 250. In addition, having a rough time estimate for the stored samples will subsequently allow the precise timings and corresponding precise satellite locations to be determined more efficiently.

In general, when deriving code-phases and pseudo-ranges, it will be possible to test the full search space on every given set of samples, because the processing is decoupled from the rate of generation of new samples by the A/D converter 16.

Figure 3:
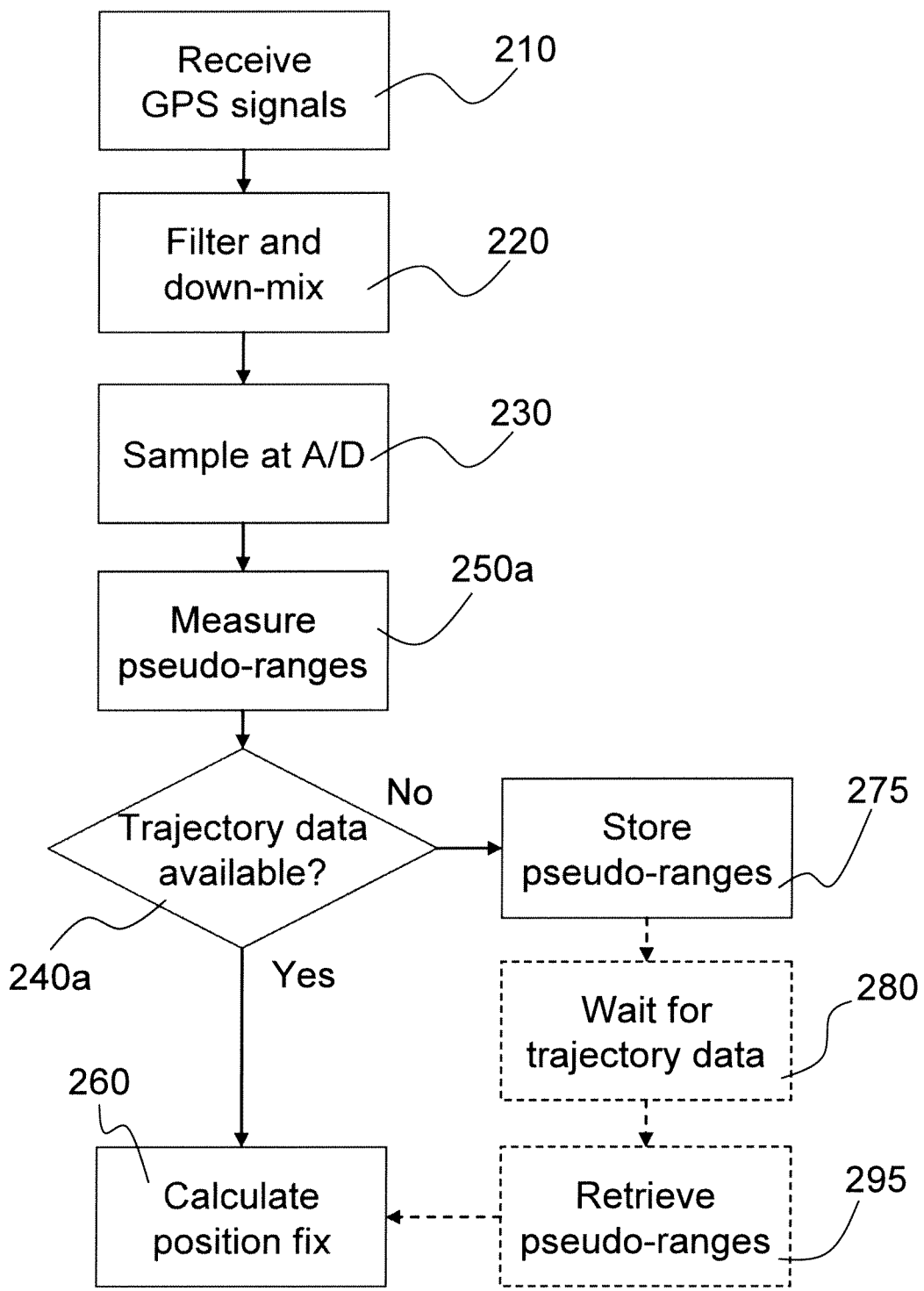
FIG. 3 is a flowchart of a related method according to a second embodiment.

A method according to a second embodiment of the invention will now be described, with reference to FIG. 3.

In this embodiment, the steps of receiving 210 GPS signals; filtering and down-mixing 220; and sampling 230 the IF signals are performed identically to the first embodiment. However, the processor of the second embodiment attempts to measure pseudo-ranges immediately 250a from each arriving set of samples. The RF front-end 12 and A/D converter 16 can be deactivated while the subsequent processing is performed, in order to reduce power consumption. Since no new samples are being generated by the A/D converter, an exhaustive search for visible satellites can be performed 250a, without the constraints on latency usually associated with a real-time GPS processing pipeline. That is, the correlation function for each satellites C/A code can be evaluated over the full range of phase shifts and frequency deviations.

By acquiring satellites first (in step 250a), the processor of the second embodiment will have greater confidence that the current set of IF signal samples will support the calculation of a viable position fix. If the measurement of pseudo-ranges 250a fails, or finds an insufficient number of satellites, then the RF front-end and A/D converter can be reactivated to capture fresh signals. Eventually, a sufficient number of satellites will be acquired and pseudo-ranges successfully calculated.

The processor then checks 240a whether satellite trajectory data is currently available. If so, it calculates a position fix 260 using the trajectory data and measured pseudo-ranges. If, on the other hand, valid satellite trajectory data is not available, the measured pseudo-ranges are stored 275 in the memory 20. Pseudo-ranges will occupy a smaller volume of memory than the corresponding raw IF data samples—a potential advantage of this embodiment over the first.

As in the first embodiment, the receiver waits 280 for trajectory data to become available. When it does, the pseudo-ranges are retrieved 295 from the memory and processed 260 to calculate a position fix.

In both of the embodiments described above, the receiver can continue to operate while waiting 280 for valid almanac and/or ephemeris information to become available. Thus, IF signals can be sampled 230 continuously or periodically and the signal samples processed according to the flowcharts of FIG. 2 or FIG. 3. Once valid trajectory information is obtained, new sets of samples will automatically be processed in real-time (due to a positive determination in step 240 or 240*a*). Samples (or pseudo-ranges) that have previously been stored in memory may also be retrieved 290 (295) and processed by the processor; however, this is not essential and they may instead remain in the memory. This optional retrieval from memory is indicated by the dashed process steps in FIGS. 2 and 3. If the data is retained in memory after trajectory data has become available, it may either be processed later by the processor 18 or it may be uploaded from the receiver to an external device, such as a PC. In this way, operation more like a known capture and process receiver can be achieved.

While the invention has been illustrated and described in detail in the drawings and foregoing description, such illustration and description are to be considered illustrative or exemplary and not restrictive; the invention is not limited to the disclosed embodiments.

Notably, in the second embodiment, instead of measuring and storing full pseudo-ranges, the receiver may store code-phases. This avoids the additional processing needed to establish the coarse timing (position in the data message). However, in this case, supplementary information will be needed when the code-phases are later processed, to allow the coarse timing ambiguity to be resolved. Typically, therefore, some other information will need to be stored along with the code-phases.

The coarse timing can be determined in a wide variety of ways, and so the type of data which should be stored to augment the code-phases can also vary widely. Ultimately, what is needed is an approximate estimate of the time-instant to which the code-phase measurement corresponds and some way to relate this estimate to the satellite clock. This then enables the position in the data message to be determined. Approximate times could be determined from an internal clock of the receiver, provided the relationship between this clock and the satellite clock can be established accurately enough to resolve the ambiguity. Thus, in one example, time-stamps generated by the internal clock can be stored to supplement measured code-phases. The relationship with the satellite clock could be established by intermittently storing a block of signal samples that is long enough to extract satellite clock information (also with a local time-stamp). Alternative ways of determining the coarse timing will be apparent to those skilled in the art. For example, it would be possible to use a coarse estimate of position (at the time the code-phases were measured) to extrapolate the coarse timing (because the timing is uniquely related to the relative positions of the satellites with respect to the receiver at every time instant). A coarse position estimate might be available from some external source, or could, for example, be calculated from the observed Doppler shifts of the satellite constellation. In this way, storing the apparent (observed) satellite broadcast frequencies could also be a suitable supplement for stored code-phases.

Signal strength measurements are also a natural complement to stored code-phase or pseudo range information, because they capture the amplitude of the correlation peak, in addition to its timing. Low amplitude peaks can be evidence of cross-talk, false detection, or multi-path effects; and so signal strength data can be used to validate or prune code-phase or pseudo range data.

In another variation, if the stored sample or code-phase or pseudo-range data are uploaded for external processing, it may be beneficial to store and upload additional information relating to the receiver or the data being uploaded. WO 2005/045458 describes how ancillary information can be output by a GPS receiver 5 to an external device which will be responsible for processing stored data (samples or intermediate measurements). This ancillary information can comprise metadata that enables the external device (such as a PC) to adapt to the particular characteristics of the receiver 5, or to the format or other characteristics of the stored data. This is useful because interoperability can be improved between a diverse range of receivers and signal processing software.

WO 2008/068704 describes how an identification code unique to the receiver 5 can be included when stored GPS data is transferred to an external device. This allows a provider of GPS signal processing software to ensure that each licensed copy of the software is only used with a single receiver and is not copied for use with other receivers.

In a related development, WO 2004/059337 has described how data output by a GPS receiver 5 can be encrypted, to ensure that the data is only processed by authorised or compatible signal processing software.

As noted already above, one of the most useful pieces of information to store with the pseudo-ranges or raw IF data samples is a time-stamp. Time-stamps can be used particularly advantageously if several sets of samples have been captured and stored (or captured; processed to measure pseudo-ranges; and the pseudo-ranges stored). For example, WO 2009/000842 has previously disclosed how the relative timings of separately captured sets of IF data samples can be used to boost efficiency when processing all the sets together.

In the method of WO 2009/000842, each set of samples is initially subjected to quick, coarse processing—for example, a correlation-function search for satellite C/A codes with a short integration time. This will detect strong satellite signals having a relatively high signal-to-noise ration (SNR). The set of samples with the strongest detected signal is then processed in detail—for example, using a longer integration period to detect weaker satellite signals. When processing of this set of samples is complete, the processor knows the location of the receiver at a given time instant, and knows the precise (satellite clock) time for that instant. The other sets of samples can then be processed, using the known time and position as a reference and using the relative difference between the time-stamps to accurately predict the satellite-clock times of the other sets. Furthermore, parameters such as the amount of Doppler shift are likely to change slowly over time and will therefore typically be correlated among sets of samples captured over reasonably short time intervals. (Note that Doppler shift is typically dominated by satellite motion and receiver LO offset, both of which are slowly varying). This insight can be used to better prioritise the correlation search strategy in the frequency dimension as well as phase-shift.

WO 2009/000842 also discloses how a complete copy of the data messages transmitted by all satellites can be used to allow pseudo-ranges and position fixes to be calculated from captures (sets of samples) of shorter duration than would otherwise be possible. This technique can be used in a variety of ways with the present invention. If the receiver decodes the data messages in real-time, the record of all data bits decoded in the recent past could be stored in the memory. This addresses the situation when sets of samples are stored 270 in the memory because satellite trajectory information has not yet been fully downloaded. Once a sufficient number of bits of the data message have been decoded, and the trajectory information extracted, it should be possible to retrospectively and uniquely match the pattern of the short (100-200 ms) set of stored samples against the decoded data message. This will resolve the timing ambiguity precisely, to allow the pseudo-range to be determined.

WO 2006/018803 describes one efficient and effective way of storing time-stamps together with signal samples: a small portion of the GPS signal samples can simply be over-written (replaced) in the memory by the time-stamp bits. This not only avoids the need for separate records of time-stamp but also ensures accurate synchronisation of the time-stamp against the received samples. The small missing part of the captured set of samples does not usually degrade the subsequent processing steps.

In other embodiments, the receiver 5 may be an assisted GPS (A-GPS) receiver, which can obtain almanac; ephemeris; or potentially full satellite data-message records from an assistance server. The server may gather this information from a fixed GPS receiver or a network of receivers dispersed around the world. Each of these reference receivers reports decoded satellite data messages to the central database. Alternatively, the aiding data could be gathered dynamically from a network of mobile GPS receivers. That is, each GPS receiver would share its own, fragmentary observations of satellite data messages with the central server. The server would aggregate these observations to form a complete record, which could then be accessed by all receivers. As noted above, communication with a data-aiding server can be by any convenient means, but will usually be via a wireless data connection of some kind.

In the first and second embodiments, described above, the mode is selected based on the availability of valid satellite trajectory data. In other embodiments, the selection of operation mode may be based on other indicators. For example, the receiver 5 may process samples in real-time (the first mode) when the device is connected to an external power supply. This means that the energy-intensive processing needed for live position-calculation is only engaged when an external power source is present. When the device is running on internal battery power, it operates in the second mode (storing samples or pseudo-ranges, without calculating position fixes) to extend battery life.

In addition, or alternatively, detection of an external power supply can also be used to trigger the processing of data that has been stored in the memory (while the device was operating in the second mode).

The dependence on power source may be combined with the dependence on availability of trajectory data, because the latter will be essential, in general, to calculate a position fix.

In still further embodiments, the mode selection can be determined, in whole or in part, in response to user input. For example, the receiver 5 may default to real-time operation (the first mode). However, an "immediate fix", to record the current location, can be requested by the user via a suitable user interface. If such an immediate fix is requested explicitly at a time when valid trajectory data is unavailable, the device switches temporarily to the second mode—storing a set of samples or derived pseudo-ranges so that the requested position can be retrospectively calculated later.

Another potentially useful variation of the methods described is to continue to store data samples (or code-phases or pseudo-ranges, as appropriate) even after a position fix has been calculated. That is, the processor both stores the raw samples (or the intermediate measurements made from them) in the memory and, concurrently, processes them to estimate a position. This approach addresses cases where satellite trajectory information is unreliable, incomplete, or is later discovered to have been erroneous. For example, if relatively stale almanac data is the only trajectory information available when the test 240 (or 240a) is evaluated, the device may nevertheless calculate 260 a position fix based on an approximate prediction of where the satellites are likely to be, while also storing the samples 270 (or pseudo-ranges 275). The resulting position estimate is unlikely to be accurate, but it may still have some value for the user (particularly if an estimated margin of error can be indicated). Later, fresh ephemeris data becomes available. The stored data can be re-processed in light of the updated, improved quality satellite trajectory information to revise and improve the position fix.

Nominally stale satellite trajectory data may be enhanced by using more advanced techniques to extrapolate the orbits of the satellites. For example, models of the movement, interaction and gravitational influence of celestial bodies (like the earth, sun and moon) may be used generate better estimates of satellite trajectory. This can allow ephemeris and almanac information to be used far outside the normal period of validity.

Note that the embodiments above have been described with reference to a super-heterodyne receiver architecture, in which RF signals are down-mixed to an intermediate frequency. Of course, those skilled in the art will readily appreciate that identical principles apply to a direct conversion receiver. Indeed, such a receiver can simply be considered to have an intermediate frequency of zero.

As will be readily apparent, the present invention is not limited to the calculation of position estimates. Other parameters such as velocity may of course be calculated in addition. For example, it is well known to calculate velocity from the Doppler shifts of satellite positioning signals, once the position of a receiver is known.

In embodiments, in addition to the conventional filtering in the RF front-end, further filtering of the received GPS signals may be performed after the signals have been sampled. For example, US 2008/0240315 describes methods and circuits for interference suppression. The filtering can be part of the RF front-end or part of the base-band processing. Digital filtering of this kind may be adaptive. That is, the sampled signals may be analysed to determine if interference is present and, if so, to measure the properties of the interference (for example, frequency or power). The digital filtering can then be adapted automatically to cancel or attenuate the interference optimally. It may be particularly beneficial to perform filtering at a higher sample rate (as output by the analogue to digital converter) and then to decimate the filtered signal samples to a lower rate (or bit-resolution, or both) before storing or processing them. If the samples are to be stored, this reduces both the volume of storage and the throughput demands on the memory interface. If the samples are to be processed immediately, decimation or resolution reduction can reduce power consumption and/or complexity of the processing hardware. However, by filtering beforehand, the quality of the resulting reduced-resolution signals is likely to be greater.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage

The invention claimed is:

1. A satellite positioning receiver comprising:
an RF front end, for receiving satellite positioning signals;
an analogue to digital converter, for sampling the received signals to generate signal samples;
a memory; and
a processor, for processing the signal samples to derive code-phases and pseudo-ranges and to calculate a position fix,
the processor having a first mode in which it is operable to process the samples as they are generated, to calculate the position fix and
a second mode in which it is operable to store the samples or the code-phases or pseudo-ranges in the memory for later processing,
wherein the processor is adapted to:
determine whether satellite trajectory information of predetermined quality is available at the receiver;
if such trajectory information is available, select the first mode, wherein the signal samples are processed to calculate a position fix; and
if such trajectory information is unavailable, select the second mode, wherein the samples are stored in the memory for later processing.

2. A satellite positioning receiver according to claim 1, wherein the first mode is selected in response to connection of the receiver to an external power supply.

3. The satellite positioning receiver of claim 1, wherein the processor is further adapted to, when satellite trajectory information of predetermined quality becomes available after a period of unavailability:
retrieve from the memory the samples that were previously stored when the second mode was selected; and
process the samples to calculate a position fix, based on the satellite trajectory information.

4. The satellite positioning receiver of claim 1, wherein:
the analogue to digital converter is operable to sample the received signals over a predetermined interval to generate a set of samples of predetermined size; and
the processor is adapted to process the set of samples exhaustively to calculate the position fix, before any further sets of samples are processed.

5. A satellite positioning receiver comprising:
an RF front end, for receiving satellite positioning signals;
an analogue to digital converter, for sampling the received signals to generate signal samples;
a memory; and
a processor, for processing the signal samples to derive code-phases and pseudo ranges and to calculate a position fix,
the processor having a first mode in which it is operable to process the samples as they are generated, to calculate the position fix and
a second mode in which it is operable to store the code-phases or pseudo-ranges in the memory for later processing,
wherein the processor is adapted to:
process the samples as they are generated, to derive code-phase or pseudo-range data;
determine whether satellite trajectory information of predetermined quality is available at the receiver;
if such trajectory information is available, select the first mode, wherein the code-phase or pseudo-range data is further processed to calculate a position fix; and
if such trajectory information is unavailable, select the second mode wherein the derived code-phase or pseudo-range data are stored in the memory for later processing.

6. The satellite positioning receiver of claim 5, wherein the processor is further adapted to, when satellite trajectory information of predetermined quality becomes available after a period of unavailability:
retrieve from the memory the code-phase or pseudo-range data that were previously stored when the second mode was selected; and
process the code-phase or pseudo-range data to calculate a position fix, based on the satellite trajectory information.

7. The satellite positioning receiver of claim 5, wherein the processor is adapted to deactivate the RF front-end and/or analogue to digital converter while processing the samples to derive the code-phase or pseudo-range data.

8. The satellite positioning receiver of claim 5, wherein:
the analogue to digital converter is operable to sample the received signals over a predetermined interval to generate a set of samples of predetermined size; and
the processor is adapted to process the set of samples exhaustively to derive the code-phase or pseudo-range data, before any further sets of samples are processed.

9. The satellite positioning receiver of claim 2 or claim 4, wherein the processor is further adapted to retrieve from the memory and process the stored samples or code-phase or pseudo-range data only when an external power source is detected.

10. The satellite positioning receiver of claim 1 or claim 3, wherein the processor is further adapted to, in the second mode, store in the memory a time-stamp associated with the stored samples or code-phase or pseudo-range data.

11. The satellite positioning receiver of claim 1 or claim 3, wherein the processor is further adapted to:
after samples or code-phase or pseudo-range data have been processed to calculate a position fix, store them in the memory;
when satellite trajectory information of better quality becomes available, retrieve the stored samples or code-phase or pseudo-range data from the memory; and
re-process the stored samples or code-phase or pseudo-range data to calculate a revised position fix, based on the better quality satellite trajectory information.

* * * * *